United States Patent [19]

Chau et al.

[11] Patent Number: 4,868,222
[45] Date of Patent: Sep. 19, 1989

[54] PREPARATION OF ASYMMETRIC MEMBRANES BY THE SOLVENT EXTRACTION OF POLYMER COMPONENTS FROM POLYMER BLENDS

[75] Inventors: Chieh-Chun Chau; Ritchie A. Wessling, both of Midland, Mich.

[73] Assignee: The Dow Chemical Company, Midland, Mich.

[21] Appl. No.: 67,321

[22] Filed: Jun. 29, 1987

Related U.S. Application Data

[63] Continuation-in-part of Ser. No. 743,211, Jun. 10, 1985, abandoned.

[51] Int. Cl.$^4$ ................................................. C08J 9/26
[52] U.S. Cl. ........................... 521/61; 210/500.36; 264/41; 521/143; 521/139; 521/134; 521/140; 521/62
[58] Field of Search ................ 521/61, 62; 264/41

[56] References Cited

U.S. PATENT DOCUMENTS

| | | |
|---|---|---|
| 3,375,208 | 3/1958 | Duddy ................................ 260/2.1 |
| 3,544,489 | 6/1966 | Dowbenko et al. ................ 260/2.5 |
| 3,615,024 | 8/1968 | Michaels ............................ 210/490 |
| 3,623,670 | 11/1986 | Mutoh et al. ...................... 521/61 |
| 3,709,774 | 5/1970 | Kimura .............................. 161/159 |
| 3,763,055 | 10/1973 | White et al. ....................... 260/2.5 |
| 3,816,170 | 6/1974 | Mudde ............................... 117/161 |
| 3,843,570 | 10/1974 | Murayama ......................... 250/2.5 |
| 3,992,495 | 11/1976 | Sano et al. ......................... 264/22 |
| 4,026,977 | 5/1977 | Bourganel .......................... 264/41 |
| 4,046,843 | 9/1977 | Sano et al. ......................... 521/61 |
| 4,100,238 | 7/1978 | Shinomura ........................ 264/49 |
| 4,705,809 | 11/1987 | Dighten et al. .................... 521/62 |

Primary Examiner—Morton Foelak

[57] ABSTRACT

Asymmetric membranes are prepared by selectively treating a major surface of an incompatible polymer blend prepared by melt blending having at least one extractable polymer component and then contacting the polymer blend with a solvent to extract the extractable polymer component. The treated surface becomes the dense layer of the membrane. The major surface is treated by crosslinking, by contacting the surface with a crosslinking agent which is subsequently cured, or by contacting the surface with an agent which reacts with groups on the surface and imparts a polar character to it.

20 Claims, No Drawings

PREPARATION OF ASYMMETRIC MEMBRANES BY THE SOLVENT EXTRACTION OF POLYMER COMPONENTS FROM POLYMER BLENDS

CROSS-REFERENCE TO RELATED APPLICATION

This is a continuation-in-part of U.S. patent application Ser. No. 743,211, filed June 10, 1985 now abandoned.

BACKGROUND OF THE INVENTION

The present invention relates to methods of preparing asymmetric membranes for the separation of components from fluid mixtures and solutions.

Asymmetric membranes, often referred to as anisotropic membranes, are membranes with a very thin, dense "active" surface supported by a porous substructure. They are useful for separating a wide variety of impurities and components from solutions. For example, asymmetric membranes have been developed and used as reverse osmosis membranes in the desalination of brackish and saline waters. They have also been developed for the separation of gases, such as the separation of acid gases from methane's as described in U.S. Pat. Nos. 3,534,528: 4,130,403 and 4,561,654, or the separation of other gas mixtures as described in U.S. Pat. No.4,230,463.

Asymmetric membranes, such as the cellulose acetate membranes known in the art, are conventionally prepared using a solution casting process. In this process a polymer is dissolved in a mixture of solvents of diverse volatilities, swelling agents and pore forming substances. The solution is cast into a thin film and the more volatile solvents are allowed to partially evaporate. The film is then immersed in a nonsolvent of the polymer to precipitate the polymer and to thereby form the asymmetric structure.

Solution casting requires careful selection and control of process parameters. These parameters include the selection of the casting solvents and additives, the temperature of the casting solution, and the method of solvent removal. Unfortunately, polymers possessing superior chemical, mechanical and thermal properties are often difficult to fabricate because of these process limitations. For example, the selection of a solvent and nonsolvent for a specific polymer often requires laborious trial and error.

In view of the deficiencies of the prior art, it is desirable to provide a method for preparing asymmetric membranes that does not entail onerous process limitations. It is also desirable to provide a method for preparing asymmetric membranes exhibiting good permeation flux and selectivity.

SUMMARY OF THE INVENTION

The present invention is a method of preparing an asymmetric membrane. This method comprises the steps of selectively treating a major surface of a premembrane structure formed of a nonporous, incompatible polymer blend prepared by melt blending having at least one extractable polymer component so as to render the surface resistant to solvent extraction: and then contacting the polymer blend with a solvent to extract the extractable polymer component from at least a preselected depth relative to the nontreated surface of the polymer blend.

Since the method of this invention does not require a complex solution casting technique, the numerous process limitations of the prior art are avoided. The asymmetric membranes prepared by this invention exhibit good permeation flux and selectivity. They are useful for gas separations, liquid separations, reverse osmosis and as substrates for composite membranes.

DETAILED DESCRIPTION OF THE INVENTION

The asymmetric membranes prepared by the method of this invention have at least one dense layer and at least one microporous layer. The dense layer acts as a discriminating layer that in a membrane process promotes the separation of components from a fluid mixture or solution contacting the membrane. The permeation selectivity depends, to a large extent on the chemical interaction of each component with the dense layer. The microporous layer contains a plurality of interconnecting pores which collectively form a flow channel through which components of the mixture or solution are readily transported with little discrimination between components. The microporous layer provides support and increased mechanical strength to the membrane structure.

In preferred embodiments of this invention, the dense layer of the asymmetric membrane is as thin as practical while maintaining a uniform layer. The permeation flux of desired components through the membrane increases as the thickness of the dense layer decreases. The practical thickness of the layer is limited by the increased likelihood of formation of unwanted discontinuities and defects, such as pinholes and microscopic cracks, within the layer as the layer is made thinner. The thickness of the dense layer is advantageously in the range from about 0.1 micron ($\mu$m) to about 10 $\mu$m. Preferably, the thickness of the dense layer ranges from about 0.1 $\mu$m to about 3.0 $\mu$m. The thickness of the layer can be controlled by varying the treatment employed to render a major surface of the polymer blend resistant to solvent extraction, as is described hereinafter.

The thickness of the microporous layer should be such that it will provide the necessary support and mechanical strength for the asymmetric membrane. The practical thickness of the microporous layer will be affected by its composition, porosity and other factors. The thickness of the microporous layer is proportional to the thickness of the polymer blend employed to make the membrane. The thickness of the polymer blend can generally range from about 20 $\mu$m to about 250 $\mu$m. Preferably, the thickness ranges from about 50 $\mu$m to about 130 $\mu$m.

The polymer blends operable in this invention are blends of at least two incompatible polymer components. At least one of the polymer components must be readily soluble in a solvent in which at least one other polymer component is substantially insoluble. The soluble and insoluble polymer components must form separate and distinct domains in the premembrane structure. The insoluble polymer should be the continuous phase and the soluble polymer discontinuous. In a preferred embodiment, the premembrane structure developed from the polymer blend is nonporous and has a distribution of polymer domains uniform in size and uniformly dispersed. Preferably, the average diameter of the domains of the discontinuous phase ranges from about 1 $\mu$m to about 10 $\mu$m. A uniform distribution of polymer domains will result in a narrow pore size distribution after one of the polymer components is extracted by the solvent to form the microporous layer. Preferred polymer blends include polyethylene/polystyrene, polypropylene/polystyrene, polysulfone/methylcellulose, polycarbonate/polyethylene oxide, and polypropylene/polyisobutylene.

The ratio of polymer components employed in the premembrane structure will depend on the composition of the blend, the desired porosity of the microporous layer, and the method of preparing the blend. Generally, as the ratio of soluble components to insoluble components increases, the percent porosity of the microporous layer increases. The desired ratio of polymer components suitably employed in the practice of this invention can be readily determined empirically.

A premembrane structure is a structure suitable as a membrane device after the treatment steps described hereinafter.

The premembrane structure can be prepared using conventional melt blending and film or fiber forming methods. As disclosed in U.S. Pat. No. 3,375,208, the polymer components can be intimately mixed under heat and pressure to form a uniform, plasticized mass and then shaped by calendaring or extrusion to form the desired premembrane structure. Any configuration of the structure can be employed which is operable for permselective applications. Flat sheets or self-supporting films can be prepared by coextruding an oriented layer or compression molding a layer of low orientation. Hollow fibers can be prepared by conventional hollow fiber spinning techniques. Tubular structures can be prepared by extrusion. Generally, premembrane structures in the form of oriented films are preferred.

After the polymer blend is prepared, a major surface of the premembrane structure formed from the polymer blend is selectively treated so as to render the surface resistant to solvent extraction. The major surface is the surface that will form the dense layer of the asymmetric membrane. Desirably, this dense layer is the one that contacts the feed stream when the membrane is disposed in a membrane device. For example, when the polymer film is employed as a flat sheet or film, the major surface can be either planar surface. When the polymer film is employed as a hollow fiber, the major surface may be the exterior longitudinal surface, where longitudinal refers to a direction parallel to the axis of the lumen. Alternatively, the major surface of the hollow fiber may be the surface of the lumen.

One method of selectively treating a major surface of the premembrane structure formed from the polymer blend so as to render the surface resistant to solvent extraction involves crosslinking the major surface. The major surface of the polymer blend can be crosslinked by a variety of conventional techniques. For example, the polymer blend can be irradiated using electron beam, thermal or UV radiation. Radiation sensitive polymers can be treated or modified with initiators, as necessary, and subjected to low amounts of radiation to induce crosslinking. For example, dimethylmaleimide modified polystyrene can be coextruded with polystyrene and subjected to UV radiation. Crosslinks can also be provided by chemical reaction of groups attached to the polymer backbone. For example, polymers bearing groups having an active hydrogen atom, such as hydroxyl or primary or secondary amine moieties, can be crosslinked with a compound bearing an average of at least two isocyanate or acyl halide moieties.

In a preferred embodiment of this invention, a major surface of the premembrane structure is irradiated by conveying the structure on a conveyor at a selected speed in the path of an electron beam. The location and thickness of the dense layer will depend on the depth of penetration of radiation into the blend, the intensity of radiation and the exposure time. These conditions can be controlled by varying the voltage of the electron beam, the beam current, and the line speed of the conveyor.

In one preferred embodiment, the polymer blend is covered with a second layer of a polymeric material prior to irradiation. When the polymer blend is irradiated, the second layer of polymeric material will absorb a substantial amount of the radiation and therefore provide a sharp gradient of the irradiated dosage across the depth of the major surface of the polymer blend. Since the irradiated dosage is greatest on or near the major surface, the dense layer will typically be located on or near the surface. In general, it is desirable that the discriminating layer be located on or near the major surface of the polymer blend. The type and thickness of the second layer of polymeric material and the irradiated dosage necessary to crosslink the major surface so as to render the surface resistant to solvent extraction can be readily determined empirically.

Another method of selectively treating a major surface of the premembrane structure formed from the polymer blend involves treating the major surface with a crosslinking agent that can diffuse into at least one of the polymer components to a limited depth. Examples of crosslinking agents include divinylbenzene and ethylene dimethacrylate. The agent is often diluted in solvent so that it can be applied uniformly to the major surface. The optimum concentration and preferred solvent will depend on the crosslinking agent and polymer blend composition. The concentration of crosslinking agent in the solution can range from about 0.5 weight percent to about 10 weight percent.

The crosslinking agent can be applied to the major surface by conventional techniques such as coating, immersion, spraying, and plasma coating. If the polymer blend has a hollow fiber configuration, the agent can be pumped through the fiber bore. If the agent is a gas, it can be dissolved in a suitable liquid carrier. Suitable liquid carriers include water, liquefied perfluorocarbon gases, and highly volatile perfluorocarbon liquids.

Once the crosslinking agent has been applied to the major surface, it can be cured to provide a crosslinked network. Crosslinking can be promoted by the techniques described previously. Of course, at least one of the polymer components must bear groups reactive with the crosslinking agent.

The time period during which the major surface is treated to induce crosslinking will depend upon factors such as the concentration of the agent, the composition of the polymer blend, the degree of crosslinking desired, and the temperature during treatment.

Yet, still another method of selectively treating a major surface of the premembrane structure formed from the polymer blend involves treating the surface with an agent which reacts with groups on the surface and imparts a polar character to it. The chemically modified surface generally has a high resistance to solvent extraction when the solvent employed is essentially non-polar. The properties of the modified surface can vary with the agent employed, the concentration of the agent, the time period of treatment, and the composition of the polymer blend. Thus, it is possible to alter properties of the dense layer, such as thickness. Additionally, the dense layer is less likely to contain undesirable flaws because an appropriate chemically modified surface can have a high resistance to the extraction solvent.

Agents which impart a polar character to the surfaces of polymer blends are known in the art. Examples of suitable agents include those which sulfonate, halogenate, carboxylate, phosphonate, or aminate the surface. For example, the major surface of the polymer blend can be treated with sulfur trioxide and halogens such as chlorine, bromine, and fluorine. As with the crosslinking agents, these agents are often diluted in solvent so that they can be applied uniformly to the major surface. Suitable solvents include ethylene glycol ethyl ether, diethylene glycol, and Freon. The concentration of agent in the solution can range from about 0.5 weight percent to about 10 weight percent.

The agent for inducing polar character can be applied by conventional techniques. Techniques described hereinbefore for applying the crosslinking agent to the major surface of the premembrane structure formed from the polymer blend are generally suitable.

After a major surface of the premembrane structure formed from the polymer blend is selectively treated so as to render the surface resistant to solvent extraction, the blend is contacted with a solvent to extract at least one polymer component to a preselected depth relative to the nontreated surface. This portion of the polymer blend from which one component is extracted forms the microporous layer of the asymmetric membrane.

The chosen solvent must be capable of selectively dissolving at least one of the polymer components and leaving at least one other polymer component substantially intact. For example, chloroform or toluene will dissolve polystyrene from a polyethylene/polystyrene blend: water will dissolve methylcellulose from a polysulfone/methylcellulose blend: methanol or water will dissolve polyethylene oxide from a polycarbonate/polyethylene oxide blend: and hexane will dissolve polyisobutylene from a polypropylene/polyisobutylene blend. The proper solvent or solvent mixture can be readily determined empirically and will depend on factors such as the composition of the polymer blend, the temperature of the solvent, and the contact time.

The solvent can be applied by the conventional techniques described hereinbefore. After it has selectively extracted at least one of the polymer components, the solvent can be removed from the remaining components of the asymmetric membrane that has been formed by allowing it to dry in air. Preferably, the residual solvent is evaporated under reduced pressure. Alternatively, the membrane can be washed with volatile diluents and then dried in air or at reduced pressure.

The asymmetric membranes prepared by the method of this invention exhibit good permeation flux and selectivity. Good permeation flux is defined herein as at least a twofold increase in the permeation rate of desired components through the membrane relative to the rate achieved by the polymer blend prior to treatment. Preferably, the permeation flux is at least a fourfold increase over the rate achieved by the untreated polymer blend. Good permeation selectivity is achieved when the ratio of permeation flux for oxygen to nitrogen is at least about 90 percent of the ratio achieved by the polymer blend prior to treatment.

The configurations in which the asymmetric membranes can be used include tubular devices, spiral wound devices, and hollow fiber membrane devices. A tubular device comprises a membrane discriminating layer present as a tubular film disposed on the inside or outside of a porous tube, which serves as a membrane support. A spiral wound device comprises a laminar sheet consisting of a plurality of membrane lamina separated by porous feed and permeate spacers wound around a central tube. A hollow fiber membrane device is similar in configuration to a shell-and-tube heat exchanger and comprises a plurality of parallel membrane compositions in hollow fiber form embedded in at least one tube sheet. All three devices are well known in the art and are generally described in Kirk-Othmer, Encyclopedia of Chemical Technology, 3rd Ed., Vol. 15, pp. 108-14 112, (1981).

The membranes resulting from the process of this invention can be used in preferred embodiments to markedly increase the concentration of hydrogen in mixtures of hydrogen, nitrogen, methane, argon and ammonia typically resulting from the synthesis of ammonia. In addition, certain membranes can be used for the separation of hydrogen sulfide and carbon dioxide from natural gas, hydrogen from petrochemical process streams, oxygen from air, and hydrogen from ammonia.

The following examples are presented to further illustrate but not limit the scope of this invention. All parts and percentages are by weight unless otherwise indicated.

EXAMPLE 1

Two mils thick film of a polymer blend consisting of 75 percent weatherable high impact polystyrene (a copolymer of 85 percent polystyrene and 15 percent EPDM rubber) and 25 percent high density polyethylene are compression molded at 400° F. in a Pasadena hydraulic press. Samples of the film, 2-inch-by-4-inch, are cut and folded in half. The samples are hot sealed around the edges to form pouches. They are subsequently immersed in a dilute solution of ethylene dimethacrylate. The solution is prepared by mixing 20 ml of ethylene dimethacrylate with 200 ml of ethylene glycol ethyl ether sold by The Dow Chemical Company under the trademark DOWANOL ® EE. After various time periods, the immersed samples are removed from the coating solution and are dried in air for two hours. The samples are opened and the coated side irradiated with electron beam radiation at a dosage of 170 KV and 20 Mrads to cure the coating. The coating is cured immediately as indicated by the stiffening of the coated surface. The samples are then immersed in toluene-filled bottles. The immersed samples are shaken in an Eberbach shaker for 16 hours to dissolve the extractable polymer components. After the extractable polymer components are removed, the samples are subsequently dried under vacuum. The oxygen and nitrogen permeation properties across the samples are measured by using a conventional gas permeation test apparatus. The results appear in Table I.

TABLE I

| Comparative Experiment or Example No. | Thickness (mils) | Ethylene Dimethacrylate Immersion Time | Toluene Leaching Time | Nominal[1] Permeation Flux for Oxygen | Permeation[2] Selectivity | Permeation Flux for Oxygen of Sample Permeation Flux for Oxygen of Control |
|---|---|---|---|---|---|---|
| A* (control) | 3.5 | — | — | $1.84 \times 10^{-8}$ | 4.7 | 1.0 |
| B* | 3.0 | — | 16 hrs. | $9.05 \times 10^{-7}$ | 1 | (Porous) |
| C* | 3.0 | 1 min. | — | $1.72 \times 10^{-8}$ | 5.1 | 0.94 |
| 1 | 2.8 | 1 min. | 16 hrs. | $6.23 \times 10^{-8}$ | 4.3 | 3.4 |
| 2 | 2.9 | 3 min. | 16 hrs. | $4.25 \times 10^{-8}$ | 4.2 | 2.3 |

[1]Measured in cc(STP)-cm/cm$^2$ · sec · atm.
[2]Defined as the ratio of permeation flux of $O_2/N_2$.
*Not an example of this invention.

The results indicate that good permeation flux and good permeation selectivity are achieved when membranes are prepared by the method of this invention. The prepared membranes exhibit at least a twofold increase in the permeation flux for oxygen over the permeation flux achieved for the control sample. The permeation selectivity of the prepared membranes decreases only slightly over the permeation selectivity achieved by the control sample. It is also noteworthy that the non-coated but solvent extracted sample is totally porous and exhibits no permeation selectivity at all, and that the coated but non-extracted sample exhibits a decrease in permeation flux for oxygen relative to the control sample.

Example 2

Sample films, 3-inch-by-3-inch, of the polymer blend of Example 1 are prepared following the same procedure. A dilute solution of ethylene dimethacrylate is prepared by mixing 1.8 ml of ethylene dimethacrylate with 20 ml of ethylene glycol ethyl ether sold by The Dow Chemical Company under the Trademark DOWANOL®EE. The prepared solution is spread onto the sample films. The coated films are dried in air for 2 hours and the coated side irradiated with electron beam radiation at a dosage of 170 KV and 20 Mrads to cure the coating. The coating is cured immediately as indicated by the stiffening of the coated surface. The samples are then immersed in chloroform for 16 hours to dissolve the polystyrene and are subsequently dried under vacuum. The permeability of oxygen and nitrogen across the membranes are measured using the same permeation test apparatus as that used in Example 1. The results appear in Table II.

TABLE II

| Sample No. | Thickness (mils) | Ethylene Dimethacrylate coating | Toluene Leaching Time | Nominal[1] Permeation Flux for Oxygen | Permeation[2] Selectivity | Permeation Flux for Oxygen of Sample Permeation Flux for Oxygen of Control |
|---|---|---|---|---|---|---|
| 6* | 3.2 | 0.5 ml | — | $1.65 \times 10^{-8}$ | 4.5 | 0.9 |
| 7 | 3.2 | 0.5 ml | 16 hrs | $5.72 \times 10^{-8}$ | 4.1 | 3.1 |

[1]Measured in cc(STP) · cm/cm$^2$ · sec · atm.
[2]Defined as the ratio of permeation flux of $O_2/N_2$.
*Not an embodiment of this invention.

The results indicate that the membranes prepared by the method of this invention exhibit good permeation flux and good permeation selectivity.

EXAMPLE 3

Sixty-four percent polystyrene sold by The Dow Chemical Company under the trademark STYRON® 685D, 30 percent high density polyethylene sold by The Dow Chemical Company under the trademark HDPE®, 6 percent of an elastomer sold by Shell Oil Company under the trademark KRATON® 2103 are melt blended together in a Haake Brabender to form a homogeneous blend. Films 2 to 4 mils thick are prepared by compression molding the blend in a Pasadena hydraulic press. They are coated with a dilute solution of ethylene dimethacrylate and are subsequently cross-linked employing the same experimental procedure as that of Example 1. Samples are cut from the film and are immersed in toluene to dissolve the polystyrene as described in the previous examples. The permeability of oxygen and nitrogen and across the membranes is measured. The results appear in Table III.

TABLE III

| Sample No. | Thickness (mils) | Ethylene Dimethacrylate Immersion Time | Toluene Leaching Time | Nominal[1] Permeation Flux for Oxygen | Permeation[2] Selectivity | Permeation Flux for Oxygen of Sample Permeation Flux for Oxygen of Control |
|---|---|---|---|---|---|---|
| 8* | 3.6 | — | — | $1.25 \times 10^{-8}$ | 4.3 | 1.0 |

TABLE III-continued

| Sample No. | Thickness (mils) | Ethylene Dimethacrylate Immersion Time | Toluene Leaching Time | Nominal[1] Permeation Flux for Oxygen | Permeation[2] Selectivity | Permeation Flux for Oxygen of Sample Permeation Flux for Oxygen of Control |
|---|---|---|---|---|---|---|
| (control) 9* | 3.5 | — | 16 hrs | $2.50 \times 10^{-6}$ | (porous) | (porous) |
| 10 | 3.5 | 1.5 min. | 16 hrs | $4.12 \times 10^{-8}$ | 4.4 | 3.3 |

[1]Measured in cc(STP)·cm/cm²·sec·atm.
[2]Defined as the ratio of permeation flux of $O_2N_2$.
*Not an embodiment of this invention.

The results indicate that asymmetric membranes exhibiting good permeation flux and good permeation selectivity are prepared by the method of this invention. A threefold increase in permeation flux for oxygen is obtained without sacrificing permeation selectivity. It is noteworthy that the non-coated sample is porous and does not exhibit selectivity.

EXAMPLE 4

Asymmetric membranes are prepared by surface sulfonation of films of polymer blends and treatment as follows.

Sample Nos. 11-15 are provided by treatment of a blend of polystyrene/polypropylene/thermoplastic elastomer as follows. A uniform blend of 64 percent polystyrene having a molecular weight of about 300,000 (sold commercially as PS Styron 685D polystyrene by The Dow Chemical Company); 30 percent polypropylene having a molecular weight of about 220,000 (sold commercially as Hercules Pro-Fax-6331 by Hercules, Incorporated); and 6 percent styrene/butadiene/styrene thermoplastic elastomer block copolymer (sold commercially as Kraton 2103 by Shell Chemical Company) is provided by melt blending the components in a Haake Brabender mixing device. Portions of the blend are compression molded in order to provide homogeneous, clear films having a thickness of 50.8 μm (2 mil). Film having sizes of about 2 inches by 1 inch are folded over and heat sealed along the edges using a Vertrod heat sealer in order to provide 1 inch by 1 inch pouches. The pouches are each immersed at room temperature in a solution comprising 8 ml sulfur trioxide and 392 ml Freon 113 (sold commercially by E. I. duPont de Nemours and Company) for a period of time as indicated in Table IV. Each pouch turns from clear to dark while in solution and the degree of darkness increases with length of immersion time. Each pouch is removed from the solution and rinsed for 1 minute with a 2.3 percent active aqueous ammonium hydroxide solution. Film samples are cut from the treated pouches and the films are immersed in chloroform at room temperature for 16 hours for further treatment. The films so treated become whitened and opaque on the side of the film which is not subjected to sulfonation treatment. The region of the film which is subjected to sulfonation treatment remains as a dense and continuous layer during treatment of the film with chloroform. Data concerning the thickness of each of the dense layers which are in the form of skins on one side of the film are presented in Table IV.

Sample Nos. 16-19 are provided by treatment of a blend of polystyrene/polyethylene/thermoplastic elastomer as follows. A uniform blend of 64 percent of the previously described polystyrene; 30 percent high density polyethylene having a molecular weight of about 125,000 (sold commercially as HDPE 12065 by The Dow Chemical Company); and 6 percent of the previously described thermoplastic elastomer is provided using techniques described hereinbefore. The blend is melt blended, compression molded to form a film, sulfonated, rinsed with aqueous ammonium hydroxide, and treated with chloroform at room temperature for 16 hours as previously described. Data concerning the thickness of each of the dense layers which are in the form of skins on one side of the films are presented in Table IV.

Sample Nos. 20-22 are provided by treatment of a blend of polystyrene/polyethylene/thermoplastic elastomer as follows. A uniform blend of 64 percent of the previously described high density polyethylene; 30 percent of the previously described polystyrene and 6 percent of a thermoplastic elastomer block copolymer (sold commercially as Kraton 1602 by Shell Chemical Company) is provided using techniques described hereinbefore. The blend is melt blended, compression molded to form a film, sulfonated, rinsed with an aqueous ammonium hydroxide, and treated with chloroform at room temperature for 16 hours as previously described. Data concerning the thickness of each of the dense layers which are in the form of skins on one side of the films are presented in Table IV.

Sample Nos. 23-25 are provided by treatment of a blend of linear low density polyethylene/high impact polystyrene as follows. A uniform blend of 50 percent of linear low density polyethylene having a molecular weight of about 135,000 (sold commercially as Dowlex ® LLDPE2045 by The Dow Chemical Company) and 50 percent of a styrene/butadiene rubber modified polystyrene is provided using techniques described hereinbefore. The blend is melt blended, compression molded to provide 2 inch by 2 inch films, formed to 2 inch by 1 inch pouches, sulfonated and rinsed with aqueous ammonium hydroxide using techniques as previously described. Film samples are cut from the treated pouches and are immersed in toluene at room temperature for 16 hours. Data concerning the thickness of each of the dense layers which are in the form of skins on one side of the films are presented in Table IV.

TABLE IV

| Sample No. | Sulfonation Time (seconds) | Dense[1] Skin Thickness (μm) |
|---|---|---|
| 11 | 30 | <2 |
| 12 | 120 | 2.5 |
| 13 | 270 | 3.5–4.0 |
| 14 | 450 | 7–8 |
| 15 | 840 | 11–14 |
| 16 | 10 | ~2 |

TABLE IV-continued

| Sample No. | Sulfonation Time (seconds) | Dense[1] Skin Thickness (μm) |
|---|---|---|
| 17 | 15 | ~2 |
| 18 | 30 | 4.5 |
| 19 | 60 | 5-6 |
| 20 | 20 | 2.5 |
| 21 | 30 | 2.5 |
| 22 | 60 | 3.5-5 |
| 23 | 20 | ~2 |
| 24 | 30 | ~2 |
| 25 | 60 | 3-4 |

[1]Thickness of dense skin layers are determined by observing microtomed crosssections of samples under an Olympus Vanox light microscope The data in Table IV illustrate that each sample comprises a dense skin layer. The thickness of the dense layer for each composition increases with increased treatment using sulfur trioxide. Each of the samples exhibit an asymmetric ratio approaching infinity (∞) indicating that there is provided a completely asymmetric membrane composition. The asymmetric ratio is the ratio of the thickness of the microporous layer to that of the dense layer.

EXAMPLE 5

Various membrane compositions are prepared using films provided by blending 64 percent of the previously described commercially available PS Styron 685D polystyrene: 30 percent of the previously described, commercially available Hercules Pro-Fax-6331 polypropylene: and 6 percent of the previously described Kraton 2103 thermoplastic elastomer. The blend is formed into films as described in Example 4. Sample No. 26 is provided by sulfonating a surface of the film, rinsing with aqueous ammonium hydroxide and treating with chloroform at room temperature for 16 hours, in a manner as described in Example 4. Sample No. C-1 is a comparison sample which is provided by employing the film as a membrane composition without further treatment. Sample Nos. C-2 and C-3 are comparison samples which are each provided by sulfonating a surface of the film, rinsing with aqueous ammonium hydroxide but not treating the film with chloroform. The oxygen permeation rates of each of the samples are determined at 25° C. using a constant volume variable pressure gas permeation test apparatus. Data are presented in Table V.

TABLE V

| Sample | Sulfonation Time (sec.) | Nominal [1]$O_2$ Permeability Coefficient ($\times 10^8$) | $\alpha^{(2)}$ $O_2/N_2$ | Flux Ratio[3] |
|---|---|---|---|---|
| 26 | 30 | 11.8 | 2.32 | 4.78 |
| C-1* | — | 2.47 | 2.30 | 1 |
| C-2* | 120 | 0.69 | 3.89 | 0.28 |
| C-3* | 30 | 1.37 | 3.6 | 0.56 |

*Not an example of the invention.
[1]Reported in cc(STP) · cm/cm² · sec · atm and is based on the thickness of the film before sulfonation and applicable treatment with chloroform.
[2]α is ratio of permeation rate of oxygen to nitrogen.
[3]Flux ratio is ratio of nominal permeability coefficient of sample to that of control (Sample No. C-1).

The date in Table V illustrate that Sample No. 26 exhibits an increased nominal oxygen permeability coefficient and flux ratio as compared to the comparison samples.

What is claimed is:

1. A method of preparing an asymmetric membrane comprising the steps of:

(a) selectively treating a major surface of a premembrane structure formed of a nonporous, incompatible polymer blend prepared by melt blending having at least one extractable polymer component, so as to render the surface resistant to solvent extraction; and then p1 (b) contacting the treated premembrane structure with a solvent to substantially extract the extractable polymer component to at least a preselected depth relative to a nontreated major surface of the polymer blend.

2. The method of claim 1 wherein the asymmetric membrane prepared has at least one dense layer and at least one microporous layer.

3. The method of claim 2 wherein the thickness of the dense layer ranges from about 0.1 μm to about 10 μm.

4. The method of claim 1 wherein the thickness of the premembrane structure ranges from about 50 μm to about 130 μm.

5. The method of claim 4 wherein one of the polymer components is soluble in a solvent in which at least one other polymer component is substantially insoluble.

6. The method of claim 5 wherein the polymer blend has a uniform distribution of polymer domains uniform in size and uniformly dispersed.

7. The method of claim 6 wherein the polymer blends are selected from the group consisting of polyethylene/polystyrene, polypropylene/polystyrene, polysulfone/methylcellulose, polycarbonate/polyethyleneoxide, and polypropylene/polyisobutylene.

8. The method of claim 1 wherein the polymer blend is in the form of an oriented film.

9. The method of claim 1 wherein the treated major surface is the surface that forms the dense layer of the asymmetric membrane.

10. The method of claim 1 wherein a major surface of the premembrane structure formed of the blend is selectively treated by crosslinking.

11. The method of claim 1 wherein a major surface of the premembrane structure formed of the polymer blend is treated with a crosslinking agent that can diffuse into the continuous phase of the polymer blend to a limited depth.

12. The method of claim 11 wherein the crosslinking agent is selected from the group consisting of divinylbenzene and ethylene dimethacrylate.

13. The method of claim 1 wherein a major surface of the premembrane structure formed of the polymer blend is treated with an agent which reacts with polymers present in the blend and imparts a polar character to the surface.

14. The method of claim 13 wherein the agent is selected from the group consisting of sulfur trioxide, chlorine, bromine, and fluorine.

15. The method of claim 14 wherein the agent is sulfur trioxide.

16. The method of claim 1 wherein the solvent is selected from the group consisting of chloroform, toluene, water, methanol, and hexane.

17. The method of claim 1 further comprising the step of removing the solvent from the asymmetric membrane produced in (b).

18. The method of claim 1 wherein the asymmetric membrane prepared exhibits at least a twofold increase in the permeation rate of desired components through the membrane relative to the rate achieved by the premembrane structure prior to treatment.

19. The method of claim 18 wherein the asymmetric membrane prepared exhibits at least a fourfold increase in the permeation rate of desired components through the membrane relative to the rate achieved by the premembrane structure prior to treatment.

20. The method of claim 1 wherein the asymmetric membrane prepared achieves a ratio of permeation flux for oxygen to nitrogen of at least about 90 percent of the ratio achieved by the premembrane structure prior to treatment.

* * * * *